United States Patent
Lochmann et al.

(10) Patent No.: US 9,394,994 B2
(45) Date of Patent: Jul. 19, 2016

(54) HYBRID PIN FOR CONNECTING A PISTON FOR AN INTERNAL COMBUSTION ENGINE TO A PISTON ROD, AND PRESSING DEVICE FOR PRODUCING THE HYBRID PIN

(75) Inventors: Roland Lochmann, Marbach (DE); Ulrich Bischofberger, Esslingen (DE)

(73) Assignee: MAHLE International GmbH, Stuttgart (DE)

( * ) Notice: Subject to any disclaimer, the term of this patent is extended or adjusted under 35 U.S.C. 154(b) by 596 days.

(21) Appl. No.: 13/883,343

(22) PCT Filed: Nov. 3, 2011

(86) PCT No.: PCT/DE2011/001928
§ 371 (c)(1),
(2), (4) Date: Jul. 3, 2013

(87) PCT Pub. No.: WO2012/083909
PCT Pub. Date: Jun. 28, 2012

(65) Prior Publication Data
US 2013/0276626 A1    Oct. 24, 2013

(30) Foreign Application Priority Data
Nov. 5, 2010   (DE) .......................... 10 2010 050 345

(51) Int. Cl.
*F16J 1/16* (2006.01)
*B21K 1/76* (2006.01)

(52) U.S. Cl.
CPC ... *F16J 1/16* (2013.01); *B21K 1/762* (2013.01)

(58) Field of Classification Search
CPC .................. F16J 1/14; F16J 1/16; F16J 1/10; B21D 1/762; F02F 3/04; F02F 3/047; B21K 1/762

USPC .............. 72/52; 92/187; 403/150, 161, 404; 123/197.1, 197.2, 193.6; 29/888.05
See application file for complete search history.

(56) References Cited

U.S. PATENT DOCUMENTS

| 1,670,564 A | 5/1928 | Breer |
| 2,244,109 A * | 6/1941 | Klein .................. H01R 4/203  16/108 |

(Continued)

FOREIGN PATENT DOCUMENTS

| DE | 39 00 186 | 7/1990 |
| JP | 59-097362 | 6/1984 |

(Continued)

OTHER PUBLICATIONS

International Search Report of PCT/DE2011/001928, date of mailing Jun. 20, 2012.

(Continued)

*Primary Examiner* — Nathaniel Wiehe
*Assistant Examiner* — Logan Kraft
(74) *Attorney, Agent, or Firm* — Collard & Roe, P.C.

(57) ABSTRACT

The invention relates to a hybrid pin (14) for connecting a piston for an internal combustion engine to a piston rod, the hybrid pin (14) consisting of a sleeve (3) made of steel and consisting of a core (2) which is pressed into the sleeve (3) and which is made of a lightweight metal alloy that can be cold-formed. The inner surface of the sleeve (3) has a profile, whereby an elastic elongation of the core (3) in the axial direction after the core (3) is pressed into the sleeve (3) is prevented to such an extent that the sleeve (3) is longer than the core (2) at both ends of the hybrid pin (14).

12 Claims, 4 Drawing Sheets

(56) References Cited

U.S. PATENT DOCUMENTS

Figure 1:
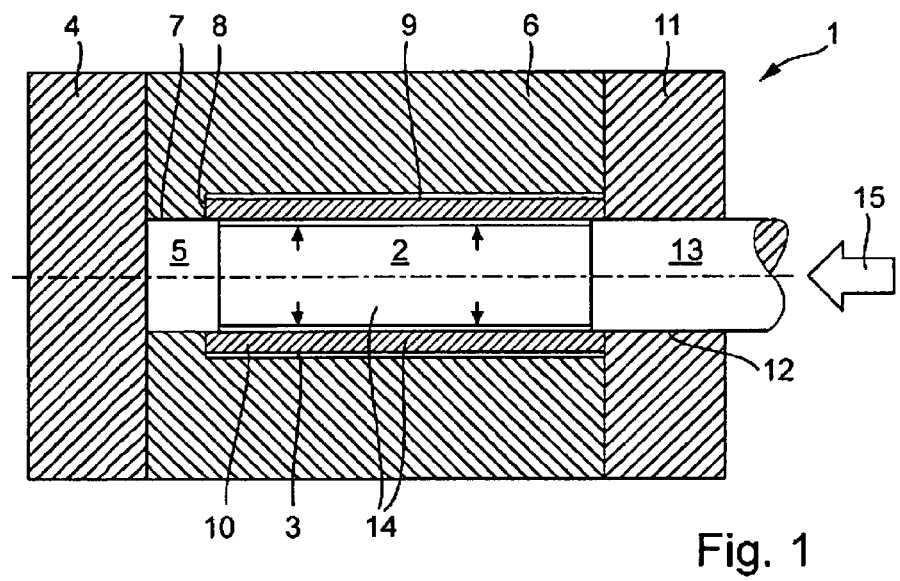

| | | | | |
|---|---|---|---|---|
| 2,770,511 | A * | 11/1956 | Powell | F16J 1/16 |
| | | | | 403/150 |
| 4,677,722 | A | 7/1987 | Emmer | |
| 4,705,711 | A * | 11/1987 | Perna | B29C 37/0082 |
| | | | | 29/DIG. 23 |
| 5,076,340 | A * | 12/1991 | Bruski | C22C 21/00 |
| | | | | 164/97 |
| 6,014,879 | A * | 1/2000 | Jaekel | B21D 26/041 |
| | | | | 29/421.1 |
| 6,502,480 | B1 * | 1/2003 | Walker | B21K 1/766 |
| | | | | 148/689 |
| 6,776,615 | B2 * | 8/2004 | Dietrich | A61C 3/10 |
| | | | | 433/159 |
| 6,912,884 | B2 * | 7/2005 | Gharib | B21D 26/043 |
| | | | | 72/58 |
| 7,418,939 | B2 * | 9/2008 | Enright | F16C 3/10 |
| | | | | 123/197.4 |
| 2010/0154628 | A1 | 6/2010 | Porta | |
| 2010/0322829 | A1 * | 12/2010 | Deny | B01J 19/0093 |
| | | | | 422/198 |

FOREIGN PATENT DOCUMENTS

| | | |
|---|---|---|
| JP | 63-308270 | 12/1988 |
| WO | WO 2006/110930 | 10/2006 |

OTHER PUBLICATIONS

International Preliminary Report on Patentability of PCT/DE2011/001928 with Written Opinion of the International Searching Authority.

German Office Action in DE 10 2010 050 345.2 dated Jul. 8, 2011, with English translation of relevant parts.

* cited by examiner

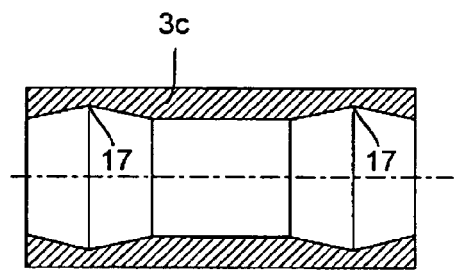
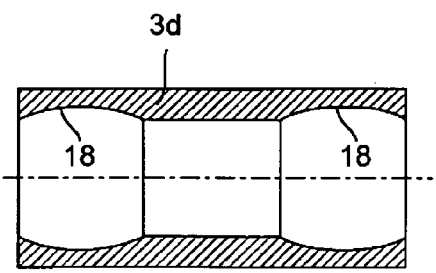
Fig. 2c    Fig. 2d
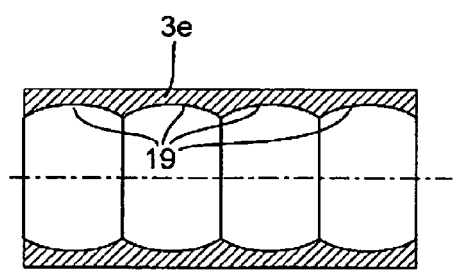
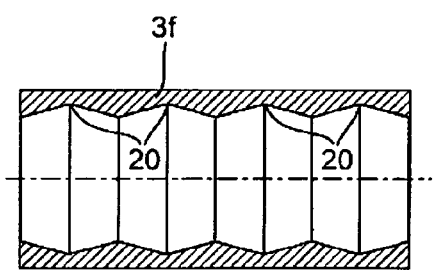
Fig. 2e    Fig. 2f
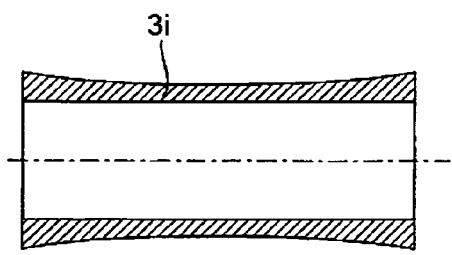
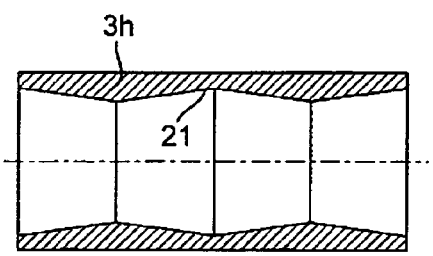
Fig. 2g    Fig. 2h

HYBRID PIN FOR CONNECTING A PISTON FOR AN INTERNAL COMBUSTION ENGINE TO A PISTON ROD, AND PRESSING DEVICE FOR PRODUCING THE HYBRID PIN

CROSS REFERENCE TO RELATED APPLICATIONS

This application is the National Stage of PCT/DE2011/001928 filed on Nov. 3, 2011 which claims priority under 35 U.S.C. §119 of German Application No. 10 2010 050 345.2 filed on Nov. 5, 2010, the disclosure of which is incorporated by reference. The international application under PCT article 21(2) was not published in English.

The invention relates to a hybrid pin for connection of a piston for an internal combustion engine with a connecting rod, whereby the hybrid pin consists of a sleeve made of steel and of a core pressed into the sleeve, made of a light-metal alloy that can be cold-formed. The invention furthermore relates to a pressing apparatus for production of the hybrid pin, consisting of a die for accommodation of the sleeve with the core pushed into the sleeve, of a punch that stands in contact with one side of the core, and of a pressing punch that stands in contact with the other side of the core.

A hybrid pin and a pressing apparatus of the type indicated initially are known from the U.S. Pat. No. 1,670,564. A disadvantage in this connection is that the core of the known hybrid pin is not secured in the sleeve to prevent displacement, particularly due to elastic shape changes in the axial direction, so that in this connection, no axial pressed composite tensions can build up, which lead to an improvement of the strength of the hybrid pin.

Accordingly, it is the task of the present invention to avoid the stated disadvantage and to create a hybrid pin having improved strength, in which the core is secured to prevent axial shape changes, so that axial pressed composite tensions can build up, which lead to an improvement of the strength of the hybrid pin.

This task is accomplished with the characteristics that stand in the characterizing part of the main claim and of the auxiliary claims.

Further advantageous embodiments of the invention are the object of the dependent claims.

In this connection, the inner profile of the sleeve ensures that the core pushed into the sleeve is secured to prevent axial displacement, that in this way, the pressed composite tensions in the core and in the sleeve are maintained, and that as a result, the hybrid pin according to the invention is given great strength.

Some exemplary embodiments of the invention will be described below, using the drawings. These show FIG. 1 a pressing apparatus for pressing a light-metal core into a steel sleeve, for the production of a hybrid pin, FIGS. 2a to 2h embodiments of the steel sleeves, FIG. 3 an embodiment of the pressing apparatus with a two-part die, the interior of which has a central convexity, and FIGS. 4a to 4h embodiments of the hybrid pins that can be produced using the pressing apparatuses.

FIG. 1 shows a pressing apparatus 1 for pressing a core 2 made of a kneaded aluminum alloy into a sleeve 3 made of steel, for the production of a hybrid pin 14 that consists of the core 2 and the sleeve 3. The pressing apparatus 1 has a rigidly mounted support 4 having a punch 5 fastened onto it, the outside diameter of which punch corresponds to the inside diameter of the sleeve 3, to such an extent that the sleeve 3 can easily be pushed onto the punch 5.

Furthermore, the pressing apparatus 1 has a tubular die 6, the interior of which has an inside diameter, in a short region 7, on the one side (here, the left side), that corresponds to the outside diameter of the punch 5, to such an extent that the die 6 can be pushed onto the punch 5 over this region 7. The axial length of the region 7 is smaller than the axial length of the punch 5 by such a dimension as the core 2 is shorter than the sleeve 3 on one side.

On the side facing away from the support 4, the region 7 makes a transition into a step-shaped widening 8 of the interior 9 of the die 6, whereby the inside radius of the interior 9 of the die 6 is increased to such an extent that it is greater than the outside radius of the sleeve 3, and that when the die 6 and the sleeve 3 are pushed onto the punch 5, a small air gap 10 occurs between the outer mantle of the sleeve 3 and the interior 9 of the die 6, the dimension and function of which will be explained in greater detail below. In this connection, the axial length of the radially enlarged region of the interior 9 corresponds to the axial length of the sleeve 3.

On the side facing away from the support 4, the pressing apparatus 1 can be closed off by a cover plate 11 that has an opening 12 in the center, through which opening a pressing punch 13 can be pushed.

The core 2 consists of a light-metal alloy that can be cold-formed, which is a kneaded aluminum alloy in the present exemplary embodiment, and contains, aside from aluminum, 1.9 to 2.7 percent by mass copper, 1.3 to 1.8 percent by mass magnesium, and 0.9 to 1.3 percent by mass iron. This alloy can be warm-hardened, whereby warm hardening can take place before or after pressing the core 2 into the sleeve 3. Here, other cold-formable light-metal alloys can also be used, which should preferably be warm-hardening. Thus, the light-metal alloy can also be a kneaded titanium alloy.

The sleeve 3 can consist of nitrided steel, in other words of steel that is alloyed, according to DIN 17211, with the elements chromium, molybdenum, and aluminum, among others. Because these elements are good nitride-forming agents, the steel is given a very good surface hardness after nitriding, with very good friction-wear resistance.

However, the sleeve 3 can also consist of a case-hardened steel or of a quenched and tempered steel, whereby these steel types also demonstrate great surface hardness and great friction-wear resistance. A further improvement of the surface hardness can be achieved by means of a DLC (diamond-like carbon) coating.

The steel of the sleeve 3 can already be hardened when it is installed, but can also be hardened only after it is installed, whereby the method of induction hardening is a possibility. The sleeve 3 is produced by means of lathing.

During assembly of the pressing apparatus 1, first the die 6 is pushed onto the punch 5, and subsequently the sleeve 3 is introduced into the interior 9 of the die 6 and, during this process, pushed onto the part of the punch 5 that projects into the radially enlarged region of the interior 9 of the die 6. Subsequently, the core 2 is pushed into the interior of the sleeve 3, the cover plate 11 is fastened onto the die 6, and the pressing punch 13 is pushed into the opening 12 of the cover plate 11.

If pressure is now exerted by the pressing punch 13 in the direction of the arrow 15, onto the core 2, the punch 5 ensures that pressure is exerted on the core 2 from both sides, so that the axial length of the core 2 is reduced, and the core 2 becomes slightly shorter than the sleeve 3, whereby the core 2 widens uniformly in the direction of the sleeve 3, in other words radially. Because the core 2 is not heated during this process, this is a cold-flow process that can take place at room temperature and generally takes place at temperatures below 200° C. This process has the advantage that it is more price-advantageous than other flow processes. Furthermore, in the cold-flow process, pressed composite tensions that will be explained further below are more likely to be maintained in the core 2 and in the sleeve 3 than if a hot-pressing process were used to produce the hybrid pin 14, because internal tensions are reduced by means of hot-pressing.

The radial widening of the core 2 brings about radial widening of the sleeve 3, and this is possible thanks to the air gap 10 between the sleeve 3 and the die 6. When the pressure of the pressing punch 13 on the core 2 decreases after the pressing process, the sleeve 3 shrinks, and a pressed connection between core 2 and sleeve 3 occurs. This produces tensile stresses in the sleeve 3 and pressure stresses in the core 2, thereby resulting in pressed composite tensions in the core 2 and in the sleeve 3, which increase the ability of the hybrid pin 14 to withstand stress. These pressed composite tensions furthermore bring about cold solidification of the core 2 on the basis of molecular processes in the material of the core 2, and this brings about a further increase in the ability of the hybrid pin 14 to withstand stress.

In FIGS. 2a to 2h, embodiments 3a to 3i of the sleeve 3 are shown, which have different inner profiles. Because the core 2 is shortened in the axial direction when it is pressed into the sleeve 3, it is desirable, in order to increase the pressed composite tensions in the core 2 and thereby to further improve the strength of the hybrid pin 14, that after completion of the axial pressure action on the core 2, the latter no longer lengthens again because of its elasticity, in other words that shortening of the core 2 is maintained. The inner profiling of the sleeves 3a to 3h serves this purpose.

Figure 2A:
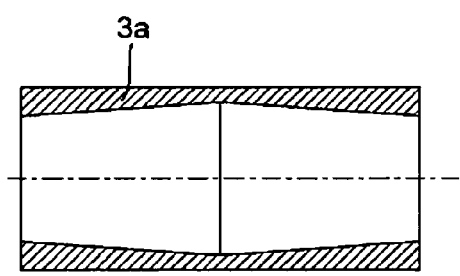
Figure 2B:
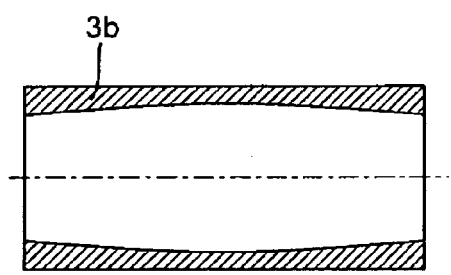

The interiors of the sleeves 3a and 3b shown in FIGS. 2a and 2b each have a circumferential convexity that reaches over their entire length, whereby the thickness of the wall of the sleeves 3a and 3b, according to FIGS. 2a and 2b, is lowest in the center, and, in the case of the sleeve 3a, increases linearly toward the two ends of the sleeve 3a, and, in the case of the sleeve 3b, increases in arc shape, in section, toward the two ends of the sleeve 3b.

The sleeves 3c and 3d according to FIGS. 2c and 2d have an interior in the shape of a circular cylinder in the center, which has circumferential convexities 17, 18 at its two ends, whereby the convexities 17 of the sleeve 3c have a center, in each instance, from which the convexities 17 decrease linearly toward both sides, while the convexities 18 of the sleeve 3d are configured in the shape of an arc, in section.

The interiors of the sleeves 3e and 3f shown in FIGS. 2e and 2f have circumferential convexities 19, 20 that are preferably uniformly distributed over their entire axial length, whereby the convexities 19 in the sleeve 3e are arc-shaped in section, and the convexities 20 of the sleeve 3f have a center, in each instance, from which the convexities 20 decrease linearly toward both sides.

The interior of the sleeve 3h according to FIG. 2h has a convexity 21 that lies in the center, which has a center from which the convexity 21 decreases linearly toward both sides. This convexity 21 ends at a distance from the ends of the sleeve 3h, on both sides. On both sides of the convexity 21, the inside diameter of the sleeve 3h increases linearly toward the end of the sleeve 3h, in each instance, which means that the wall thickness of the sleeve 3h decreases in the two end regions of the sleeve 3h, which brings with it the advantage that the weight of the sleeve is thereby reduced.

Figures 4A, 4B:
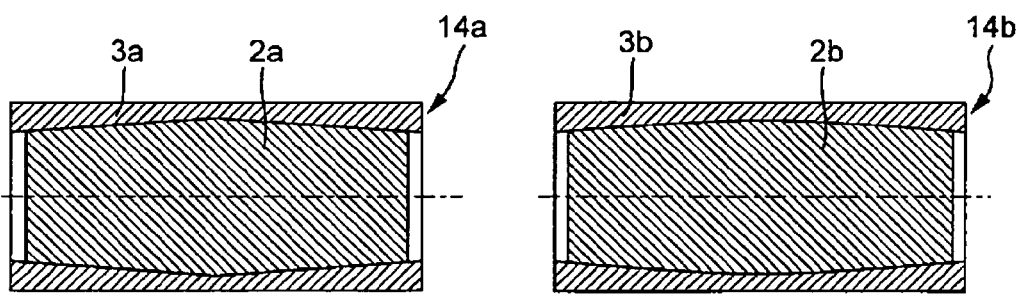
Figure 4C:
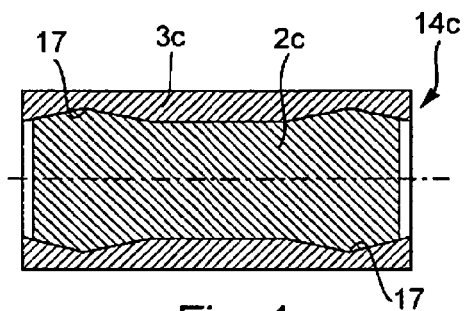
Figure 4D:
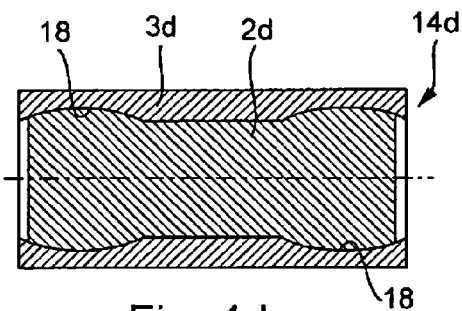
Figure 4E:
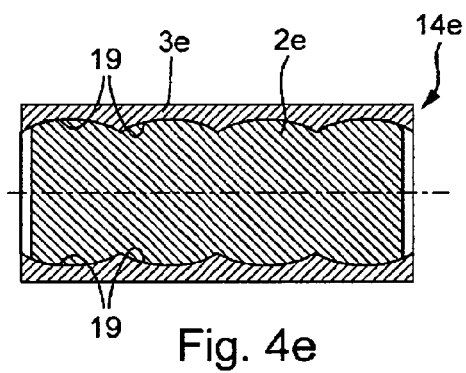
Figure 4F:
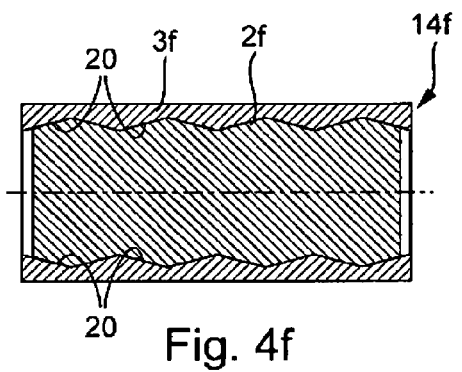

The sleeve 3i shown in FIG. 2g has an interior in the shape of a circular cylinder without profiling, but has an outer surface that is configured concave in section. Within the scope of the pressing process, the center part of the sleeve bulges out to such an extent that the sleeve takes on the shape of the sleeve 3b shown in FIG. 2b, with an outer surface in the shape of a circular cylinder and a centrally located, circumferential convexity with an arc-shaped shape, in section, so that a hybrid pin 14b occurs as shown in FIG. 4b, the shape of which is maintained even after the pressure of the pressing punch 13 is released, because of the pressed composite tensions in the core 2b and in the sleeve 3i, 3b.

It is also possible but not shown in the figures to configure the inner profile of the sleeve 3 in spiral shape. Such a profile is lathed into the inner surface of the sleeve.

A further possibility not shown in the figures consists in coating the inner surface of the sleeve with a suspension that prevents axial displacement of the core 2 in the sleeve 3. This suspension has micro-dispersed particles with a size in the μm range, composed of a hard material that can be diamond powder, quartz sand, or SiO2 powder. The suspension is sprayed onto the inner surface of the sleeve. In this connection, it is also possible to cover the inner surface of the sleeve with a thin film in which the above material is contained in micro-dispersed manner.

In a further embodiment of the invention, for the purpose of fixation of the core 2 in the sleeve 3, the inner surface of the latter can be roughened, whereby the roughness lies in the μm range. This roughening can be produced by means of groove formation, for which purpose the methods of precision lathing or milling are suitable.

Furthermore, the inner surface of the sleeve can be divided up into different sections, viewed in the axial direction, which have differently coarse profiling. For example, the axially outer sections can be profiled coarsely and the axially inner sections can be profiled finely. Since the excess length of the core 2 relative to the sleeve 3 must be all the greater, the coarser the profiling of the inner surface of the sleeve, this results in the advantage that the excess length of the core 2 can be reduced by means of the finer profiling.

Figure 3:
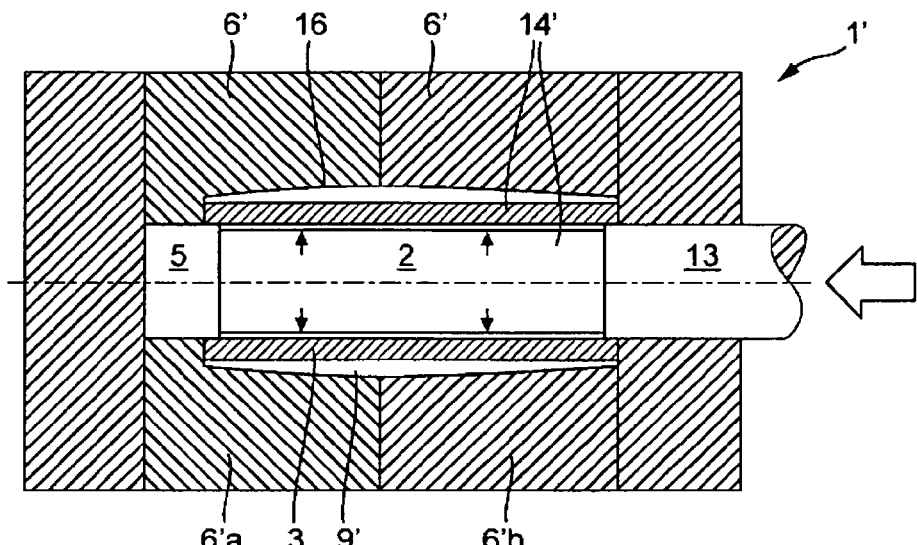

An embodiment of the pressing apparatus 1' shown in FIG. 3 has a combination die 6' consisting of two die parts 6'a and 6'b. This combination die 6' furthermore has a circumferential radial convexity 16 of the interior 9' that extends over its entire length. In this way, the result is brought about that after the core 2 is pressed into the sleeve 3, and after the radial widening of the sleeve 3 that occurs as a result, the center part of the sleeve 3 remains widened, so that the entire hybrid pin 14' maintains a center convexity that brings about a further increase in the strength of the hybrid pin 14'. This deformation of the hybrid pin 14' brings with it the need for the combination die 6' to be configured in two parts, whereby the die halves 6'a and 6'b are pulled away from one another when the hybrid pin 14' with the center convexity is removed from the pressing apparatus 1'.

Embodiments of the hybrid pins 14' and 14a to 14f that are produced with the sleeves 3a to 3g are shown in FIGS. 4a to 4g. The cores 2a to 2f are prevented from expansion in the axial direction by means of the shapes of the inner surfaces of the sleeves 3a to 3g, so that the cores 2a to 2f are shorter at the two ends of the hybrid pins 14' and 14a to 14f than the related sleeves 3 and 3a to 3g.

The hybrid pin 14' has been produced in the pressing apparatus 1' using the combination die 6', whereby in the case of the present exemplary embodiment, the sleeve 3 without any inner profiling was used. Solely due to the fact that the entire sleeve 3 is given a central convexity in the combination die 6', as a result of the pressing process, the inner surface of the sleeve 3g in the hybrid pin 14' also has a circumferential radial convexity that extends over the entire axial length of the sleeve 3, which convexity prevents the core 2b in question from expanding in the axial direction.

Figure 4G:
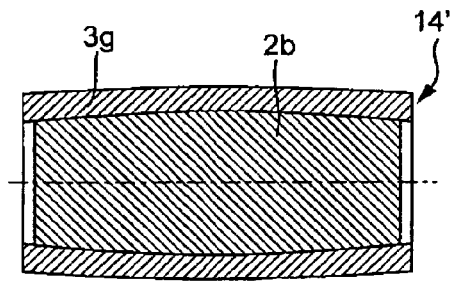
Figure 4H:
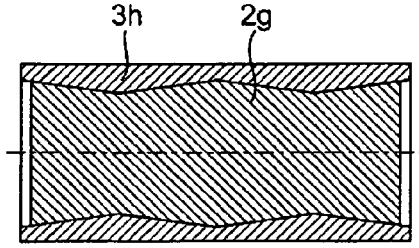

Subsequent to the pressing process for production of the hybrid pin 14' according to FIG. 4g, the outer surface of the hybrid pin 14' is machined by means of a cutting production method (lathing, milling), to such an extent that the outer surface of the hybrid pin 14' assumes the shape of a circular cylinder and therefore the shape of the hybrid pin 14b shown in FIG. 4b.

Finally, it is pointed out that in FIGS. 2 and 4, the inner profiles of the sleeves and the inner profile of the combination die 6' shown in FIG. 3 are not drawn true to scale, but rather have a profile depth of only a few µm. In the present exemplary embodiments, the inner profiles of the sleeves 3 have a profile depth of 30 µm, and the inner profile of the combination die shown in FIG. 3 has a profile depth of 10 µm.

| Reference Symbol List | |
|---|---|
| 1, 1' | pressing apparatus |
| 2, 2a to 2g | core |
| 3, 3a to 3i | sleeve |
| 4 | support |
| 5 | punch |
| 6 | die |
| 6' | combination die |
| 6'a, 6'b | die half |
| 7 | region of the interior 9 |
| 8 | widened part of the interior 9 |
| 9, 9' | interior |
| 10 | air gap |
| 11 | cover plate |
| 12 | opening |
| 13 | pressing punch |
| 14, 14', 14a to 14f | hybrid pin |
| 15 | arrow |
| 16, 17, 18, 19, 20, 21 | convexity |

The invention claimed is:

1. Hybrid pin (14) for connection of a piston for an internal combustion engine with a connecting rod, wherein the hybrid pin (14) consists of a sleeve (3) made of steel and of a core (2) pressed into the sleeve (3), the core being made of a light-metal alloy, wherein the alloy consists of a material that can be cold-formed,
   wherein the inner surface of the sleeve (3) has a profile in which the inside diameter of the sleeve (3) decreases toward the two ends of the sleeve (3), thereby making it possible to prevent elastic elongation of the core (2) in the axial direction, after the core (2) has been pressed into the sleeve (3), to such an extent that the sleeve (3) is longer than the core (2) at both ends of the hybrid pin (14).

2. Hybrid pin (14) according to claim 1, wherein the light-metal alloy is an aluminum alloy, which contains, aside from aluminum, 1.9 to 2.7 percent by mass copper, 1.3 to 1.8 percent by mass magnesium, and 0.9 to 1.3 percent by mass iron, or is a kneaded titanium alloy.

3. Hybrid pin (14) according to claim 1, wherein the steel is a nitrided steel with chromium, with molybdenum, and with aluminum, a case-hardened steel, or a quenched and tempered steel.

4. Hybrid pin (14a) according to claim 1, wherein the wall thickness of the sleeve (3a) is lowest in the axial center of the sleeve (3a) and increases linearly toward the two ends of the sleeve (3a), so that a radial circumferential convexity of the interior of the sleeve (3a) that extends over the entire axial length of the sleeve (3a) occurs, which convexity decreases linearly toward the two ends of the sleeve (3a).

5. Hybrid pin (14b) according to claim 1, wherein the wall thickness of the sleeve (3b) is lowest in the axial center of the sleeve (3b) and increases in arc shape, in section, toward the two ends of the sleeve (3b), so that a radial circumferential convexity of the interior of the sleeve (3b) that extends over the entire axial length of the sleeve (3b) occurs, which convexity decreases in arc shape, in section, toward the two ends of the sleeve (3b).

6. Hybrid pin (14c) according to claim 1, wherein the axially central part of the interior of the sleeve (3c) is configured in the shape of a circular cylinder, and that the interior of the sleeve (3c) has circumferential convexities (17) at its two ends, which each have an axial center, from which the convexities (17) decrease linearly toward both sides.

7. Hybrid pin (14d) according to claim 1, wherein the axially central part of the interior of the sleeve (3d) is configured in the shape of a circular cylinder, and that the interior of the sleeve (3d) has circumferential convexities (18) at its two ends, which are shaped as arcs, in section.

8. Hybrid pin (14e) according to claim 1, wherein the interior of the sleeve (3e) has circumferential convexities (19), in arc shape in section, uniformly distributed over the entire axial length.

9. Hybrid pin (14f) according to claim 1, wherein the interior of the sleeve (3f) has circumferential convexities (20) uniformly distributed over the entire axial length, which convexities have an axial center, in each instance, from which the convexities (20) decrease linearly toward both sides.

10. Hybrid pin (14) for connection of a piston for an internal combustion engine with a connecting rod, wherein the hybrid pin (14) consists of a sleeve (3) made of steel and of a core (2) pressed into the sleeve (3), the core being made of a light-metal alloy, wherein the alloy consists of a material that can be cold-formed, wherein the inner surface of the sleeve (3) has a profile that is configured in spiral shape, thereby making it possible to prevent elastic elongation of the core (2) in the axial direction, after the core (2) has been pressed into the sleeve (3), to such an extent that the sleeve (3) is longer than the core (2) at both ends of the hybrid pin (14).

11. Pressing apparatus (1') for production of a hybrid pin (14') for connection of a piston for an internal combustion engine with a connecting rod, wherein the hybrid pin (14') consists of a sleeve (3g) made of steel and of a core (2b) made of aluminum, consisting of a die (6') for accommodation of the sleeve (3g) with the core (2b) pushed into the sleeve (3g), of a punch (5) that stands in contact with one side of the core (2b), and of a pressing punch (13) that stands in contact with the other side of the core (2b), wherein the die (6') consists of two die parts (6'a, 6'b) that are divided in its axial center, and has an interior (9') having a circumferential radial convexity 16 that extends over its entire axial length, so that not only can the core (2b) be pressed into the sleeve (3g) by means of pressure of the pressing punch (13) on the core (2b), but also the axially center part of the sleeve (3g) can be radially widened.

12. Hybrid pin (14') for connection of a piston for an internal combustion engine with a connecting rod, wherein the hybrid pin (14') consists of a sleeve (3g) made of steel and of a core (2b) pressed into the sleeve (3g), the core being made of a light-metal alloy, wherein the alloy consists of a material that can be cold-formed, wherein after the pressing process, not only the outer surface but also the interior of the sleeve (3g) has a radial, circumferential convexity that extends over the entire axial length of the sleeve (3g), which convexity decreases in arc shape, in section, toward the two ends of the sleeve (3*g*), and that after a subsequent material-removing final machining process, the sleeve (3*g*) has a cylindrical outer surface (3*b*).

\* \* \* \* \*